United States Patent [19]

Reeder

[11] 4,300,284
[45] Nov. 17, 1981

[54] METHOD AND APPARATUS TO ORGANIZE AND TO ELECTRICALLY CONNECT WIRES

[75] Inventor: Larry R. Reeder, San Jose, Calif.

[73] Assignee: Raychem Corporation, Menlo Park, Calif.

[21] Appl. No.: 969,927

[22] Filed: Dec. 15, 1978

[51] Int. Cl.³ .................... H01R 43/02; B23P 19/00
[52] U.S. Cl. .................................. 29/860; 29/749; 29/755; 174/112; 174/DIG. 8
[58] Field of Search .............. 29/628, 630 R, 624, 29/755, 749, 447, 411; 174/112, 117 R, 34, DIG. 8; 206/330, 331, 329, 328, 347, 344; 248/49; 428/44, 166; 283/7, 18, 21, 37; 339/176 M; 285/137; 256/34

[56] References Cited

U.S. PATENT DOCUMENTS

| | | | |
|---|---|---|---|
| 2,027,962 | 1/1936 | Currie . | |
| 2,920,384 | 1/1960 | Fasoli et al. | 29/630 R X |
| 3,086,242 | 4/1963 | Cook et al. . | |
| 3,303,243 | 2/1967 | Hughes et al. . | |
| 3,459,878 | 8/1969 | Gressitt et al. | 29/624 X |
| 3,513,524 | 5/1970 | Switzer et al. . | |
| 3,531,759 | 9/1970 | Hansen | 339/176 M X |
| 3,667,101 | 6/1972 | Kloth | 29/755 X |
| 3,678,174 | 7/1972 | Ganzhorn | 29/628 X |
| 3,721,749 | 3/1973 | Clabburn | 174/DIG. 8 X |
| 3,736,366 | 5/1973 | Wittenberg | 174/34 |
| 3,774,884 | 11/1973 | Singer | 256/34 X |
| 3,894,731 | 7/1975 | Evans . | |
| 3,913,444 | 10/1975 | Otte | 29/447 X |
| 3,945,114 | 3/1976 | Siden et al. . | |
| 3,985,852 | 10/1976 | Evans . | |
| 4,032,010 | 6/1977 | Evans . | |
| 4,034,450 | 7/1977 | Carlomagno et al. . | |
| 4,052,778 | 10/1977 | Siden et al. . | |

FOREIGN PATENT DOCUMENTS

| | | | |
|---|---|---|---|
| 460459 | 1/1937 | United Kingdom . | |
| 658664 | 10/1951 | United Kingdom . | |
| 774074 | 5/1957 | United Kingdom . | |
| 837310 | 6/1960 | United Kingdom . | |
| 1062222 | 3/1967 | United Kingdom | 285/137 |
| 1382722 | 2/1975 | United Kingdom . | |

Primary Examiner—Nicholas P. Godici
Assistant Examiner—C. J. Arbes
Attorney, Agent, or Firm—Lyon & Lyon

[57] ABSTRACT

To organize and electrically terminate both ends of a plurality of wires, an apparatus comprising an array of interconnected, substantially parallel passageways is placed over the wires proximate to the first ends of the wires. The first ends of the wires are electrically terminated, and then the array is slid along the wires toward the second ends thereof for organizing the wires. The second ends of the wires are then electrically terminated.

15 Claims, 5 Drawing Figures

METHOD AND APPARATUS TO ORGANIZE AND TO ELECTRICALLY CONNECT WIRES

BACKGROUND

This invention relates to apparatus and methods for organization, identification and termination of a plurality of wires.

Procedures and apparatus for identifying, organizing, and terminating each of a plurality of wires such as for a multi-pin connector are known. For example, U.S. Pat. No. 4,034,450 describes a method and apparatus for installing marker sleeves on electrical wiring, and U.S. Pat. Nos. 3,894,731; 3,985,852; and 4,032,010 describe an apparatus and method for placing indicia on such marker sleeves. Method and apparatus for connecting marked wires are described in U.S. Pat. Nos. 3,721,749; 3,513,524; 3,945,114; 4,034,450; and 4,052,778. These nine patents are incorporated herein by this reference.

According to commercial practice, a variety of wires are electrically connected by first heat-shrinking a marker at both ends of each of the wires. Then, one end of each wire is terminated in a desired configuration, such as by use of the heat-recoverable article described in U.S. Pat. No. 3,721,749. The next step is termination of the opposite end of each wire in the same configuration. This is currently done by the difficult task of searching through the multitude of wires, until the wire with the proper marking is located. Then this wire is inserted into the correct termination point. Since this needs to be done at both ends for each of up to 60 or more wires, this process is very time consuming, expensive and requires skilled labor. Furthermore, it is relatively easy to terminate to an incorrect terminal, thereby resulting in an inoperable electrical apparatus.

Therefore, there is a need for an inexpensive, reliable, and facile method for organizing, identifying, and electrically terminating a plurality of wires, and there is a need for an apparatus for practicing this method.

SUMMARY OF THE INVENTION

According to present invention, there is provided a method and an apparatus with the above features. To organize and electrically terminate both the first and second ends of a plurality of wires, there is placed over the wires proximate to the first ends of the wires an organizer comprising an array of interconnected, substantially parallel passageways. The array is slideable over the wires and no more than one wire is located in a passageway. The first end of the wires are electrically terminated in a selected sequence. The array is slid along the wires towards the unterminated ends of the wires, thereby organizing the wires in a sequence corresponding to the sequence in which the first ends of the wires are electrically terminated. The second ends of the wires are then electrically terminated in the corresponding sequence.

A preferred organizer for practicing this method comprises at least two arrays of passageways, where a passageway of one array is aligned with a corresponding passageway of another array. Each array is detachably connected to at least one other array. Preferably the passageways are heat-recoverable material and are preferably marked on their exterior surface, where aligned passageways have corresponding marks which function to identify the wire contained therein.

When using this preferred apparatus, a first array is detached from the apparatus and heat-recovered on the wires proximate to the first ends thereof for organizing and identifying the wires. Likewise, a second array of the apparatus is heat-recovered on the wires proximate to the second ends thereof for similarly organizing and identifying the wires. Thus, the apparatus and method of the present invention not only facilitate easy termination of both ends of a plurality of wires, but also function to organize and mark the wires at both ends.

DRAWINGS

These and other features, aspects and advantages of the present invention will become more apparent with respect to the following description, appended claims, and accompanying drawings where:

Figure 1:
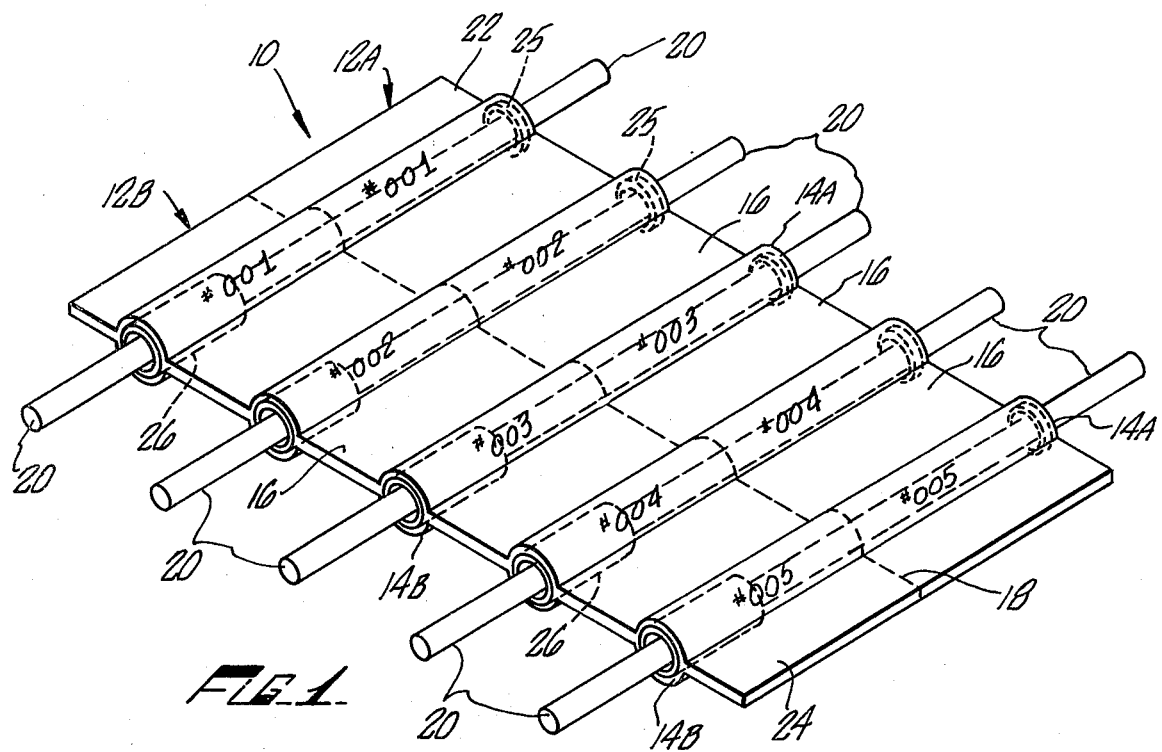
FIG. 1 represents an organizer useful for organizing and terminating a plurality of electrical wires according to present invention.
Figure 4:
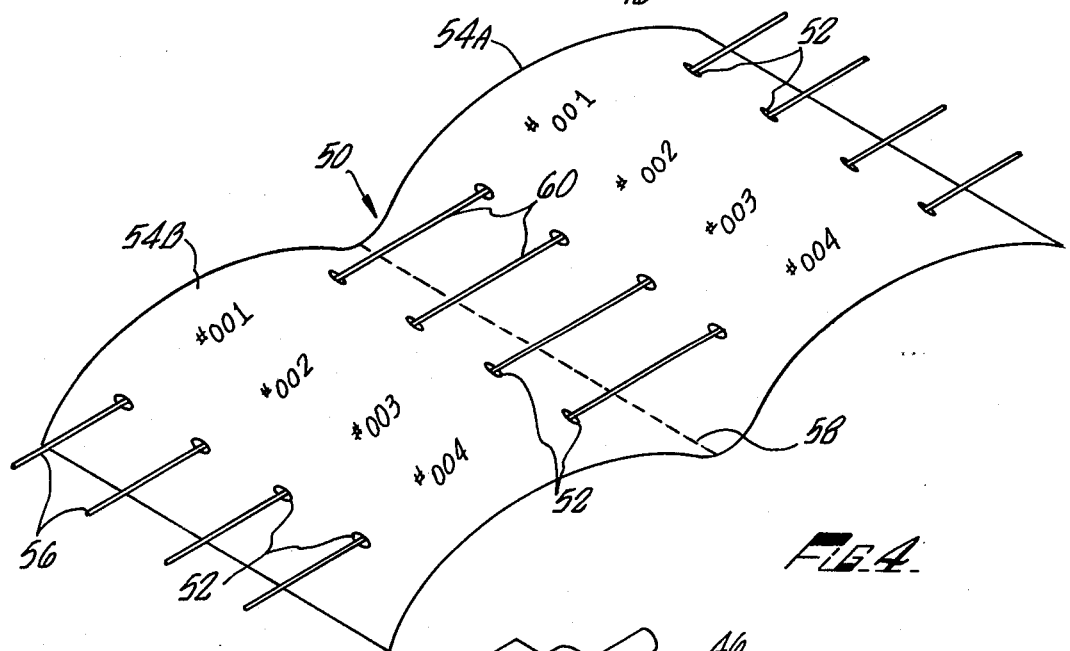
Figure 5:
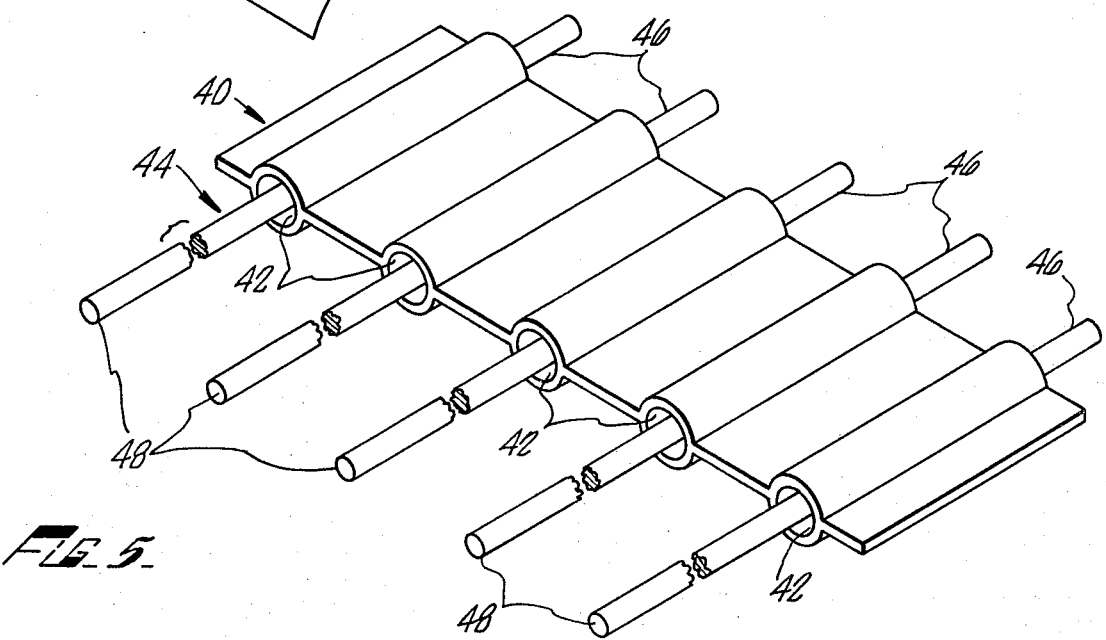

FIGS. 4 and 5 each show a simplified version of the organizer of FIG. 1.

DESCRIPTION

A plurality of electrical wires can be connected to other wires or to terminals of an electrical device with the organizer 10 shown in FIG. 1. The organizer 10 comprises two arrays, a first array 12A and a second array 12B. Each array comprises a plurality of tubular, interconnected, substantially parallel, enclosed passageways 14A and 14B, respectively. The exterior surface of each passageway is suitable for marking, and as shown in FIG. 1 the exterior of each passageway is marked with an indicia. The passageways of one array are aligned with corresponding passageways of another array, and aligned passageways have corresponding indicia. For example, the passageway of the first array marked "#001" is aligned with the passageway of the second array marked "#001".

The arrays 12A and 12B are detachably connected to each other by means of a perforated score line 18 traversing the width of the article 10. Other means for detachably connecting arrays together can be used. For example, it is possible for the two arrays to be connected to each other only at their edges, thereby facilitating detachment of one array from another.

The organizer 10 can comprise more than two arrays. For example, three or more arrays can be detachably connected to each other with each passageway of each array being aligned with the corresponding passageway of each other arrays. It is not necessary for all the arrays to have the same number of passageways. However, it is preferred that each array have at least one passageway for each wire to be terminated. Although in FIG. 1 each array comprises more than one layer of passageways, with the passageways stacked one on top of the other, or with the passageways horizontally offset.

Preferably the organizer 10 is formed from materials sufficiently rigid that the passageways maintain their open configuration to allow passage of wires 20 therethrough. Materials which are suitable are rigid cardboard and paper, metals, and plastics. Preferably the apparatus 10 is formed from a heat-recoverable material such as polymeric material capable of having plastic or elastic memory imparted thereto. Materials having such memory have been dimensionally changed from an original heat stable configuration to a dimensionally heat unstable configuration. Such materials tend to move in the direction of the original configuration upon the application of heat.

Examples of such heat recoverable materials are found in Currie, U.S. Pat. No. 2,027,962 and Cook et al., U.S. Pat. No. 3,086,242, both of which are incorporated herein by reference. One method of making a heat recoverable material comprises exposing a thermoplastic material to an amount of heat which is insufficient to allow the material to melt but sufficient to allow the molecular structure to become distorted; and then distorting the material to a new configuration and cooling the material in its distorted state. Subsequent increases in temperature sufficient to reduce locked-in stresses caused by the initial plastic deformation will cause the article to tend to recover to its initial state.

Another manner in which heat recoverable articles can be made involves the formation of a polymeric article having a first dimension, followed by crosslinking of the polymer. The crosslinking can be effected by chemical means, e.g., with peroxides, or by irradiation or by combinations of the two. Subsequent heating of the material melts the crystals in a crystalline thermoplastic material or significantly lessen other internal molecular forces such as hydrogen bonding or dipole-dipole interactions to an extent sufficient to allow distortion of the product. Upon cooling of the heated and distorted article, there is obtained a product which remains in its distorted shape while at room temperature, due to the reformation of strong interchain forces such as crystallinity which at low temperatures dominate the contrary stresses resulting from crosslinking. Upon reheating, the crosslink forces become dominant and the material tends to recover to its original geometry.

Following expansion at an elevated temperature to a new dimension, the temperature of the material is lowered to a temperature less than that at which expansion occurs and below a transition temperature of the material. Stress imparted by the expansion is thereby deposited in the material's "memory bank" for subsequent withdrawal upon raising the temperature to its heat recovery temperature.

Exemplary of the polymeric materials to which heat recoverability can be imparted by the above and other means are polyethylene, polybutene, various copolymers of ethylene, propylene and butene, polyvinyl halides, e.g., polyvinyl chloride; polyacrylates; polyamides, e.g. nylon 6 or nylon 66; polyesters, e.g. polyethylene terephthalate; fluorocarbon polymers such as polytetrafluoroethylene; ionomers, polyurethanes, and other materials such as epoxy resins. Particularly preferred are vinylidene fluoride polymers such as polyvinylidene fluoride (e.g. Kynar), vinylidene fluoride-hexafluoropropene copolymer (Kel-F, available from the Minnesota Mining and Manufacturing Company). Any of the foregoing materials can be acted upon by the process of this invention, although it is preferred that cross-linked polymeric material be employed.

There are bonded longitudinal seams 16 between the passageways. The bonding of the seams 16 can be advantageously achieved by fusion bonding as by solvent bonding, or, preferably by the employment of heated platens or rollers. Alternatively the elements to be bonded can be heated to an elevated temperature and bonding achieved by employment of unheated rollers or platens.

The opposed walls bonded by longitudinal seams can be those of a previously extruded or otherwise formed hollow article. Preferably, however, the opposed walls are formed by first and second plies integrally bonded to one another along the lateral edges thereof, forming the lateral longitudinal seams 22 and 24. The seams 16 between passageways can be simultaneously or subsequently formed. Alternatively, the hollow member from which the connection device of the invention is made can be formed from a single ply, one pair of whose lateral edges have been brought into adjacency by folding of the ply and integrally bonded to one another to form a single, longitudinally aligned seam. The opposed walls thereby presented to one another can be simultaneously or subsequently longitudinally bonded to form the seams 16 defining and interconnecting the passageways.

The device of the invention can be continuously manufactured. For example, two plies of material capable of having heat recoverability imparted thereto can be unwound from rolls and their lateral edges continuously bonded together to form a hollow member. Simultaneously or thereafter the opposed walls of the formed hollow member can be integrally bonded by passing the member between heated rollers adapted to form trains of longitudinal seams across the member to define passageways therein. The elongate article so formed can then be irradiated, heated, pneumatically expanded and cooled in expanded condition, all as shown in the aforementioned Cook U.S. Pat. No. 3,086,242. If desired, the continuously formed hollow member can be partitioned into discrete isolated passageways by forming lateral bonded seams across the width of the hollow member and the resulting envelopes continuously needle-expanded as disclosed in Hughes, et al. U.S. Pat. No. 3,303,243, the disclosure of which is incorporated herein by reference. In either event, the continuously formed heat recoverable passageways can then be cut to form individual organizers like those described hereinabove.

As described below, the passageways can be heat-recovered about an electrical connection for insulating the connection. In addition, in a version of the present invention, the passageways can be used for forming electrical connections. This is accomplished by including at least one fusible solder insert 25 in at least a portion of at least one of the passageways 14A of the first array 12A. Similarly, if so desired at least one fusible solder insert 26 can be disposed in at least a portion of at least one of the passageways 14B of the second array 12B. In the course of recovery of the passageways, the fusible solder inserts fuse and when the array is placed over the ends of the wire, the inserts can help form the electrical connections. The solder inserts can be in a shape of a ring, U, bar, ball or other form, but preferably the form of annular rings as shown in FIG. 1. Preferably the solder inserts contain a predetermined proportion of solder and flux whereupon heating of the insert, the flux flows to prepare the surfaces and the solder melts to form the joint. Recesses can be formed in the walls of the passageways to accommodate the fusible solder inserts. If desired, fusible rings of polymeric material can be used either independently or in conjunction with solder inserts as described in U.S. Pat. No. 3,721,749.

As an alternative to using solder, a heat-recoverable metal can be used to form an insert which can effect electrical connection.

Figure 3:
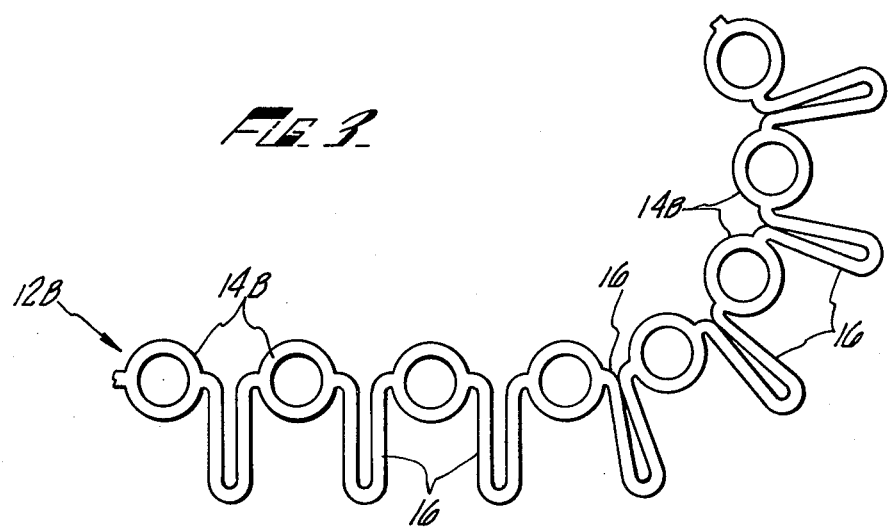
FIG. 3 shows the organizer of FIG. 1 in a deformed configuration.

As shown in FIG. 3, preferably the longitudinal seams 16 between the passageways are deformable. This permits the spatial arrangement between the passageways to be changed to a selected spatial configuration corresponding to the spatial configuration of the terminal block to which electrical connection is to be made. In some applications, the terminals to which connection is to be made are not linearly arranged, but rather are arranged in a curve such as a spiral shape. With a deformable organizer, the passageways can be placed into a spatial configuration correponding to the curved spatial configuration of the terminal block as shown on the right side of FIG. 3. Furthermore, in some applications, the terminals of one end of the wires are closer together than the terminals at the other end of the wires. To accommodate this, passageways can be forced closer together as shown on the left side of FIG. 3. In other words, with a deformable organizer, the spatial arrangement between passageways and wires contained therein can be changed without changing the numerical sequence of the passageways and wires therein contained.

Markings can be placed on the exterior surfaces of the passageways by the methods described in U.S. Pat. Nos. 3,894,731; 3,985,852; and 4,032,010. For ease in placing the markings on the exterior surfaces of the passageways, the passageways can be formed with one portion of their exterior surface being flat, or expansion of at least a portion of each passageway can be delayed until after that portion has been marked as required.

In simplified versions of the method of the present invention, neither the terminating or marking features of the organizer 10 of FIG. 1 is used. In one simplified version, the organizer 40 shown in FIG. 5 can be used. This simplified organizer 40 comprises an array of interconnected, substantially parallel passageways 42, where the array is slideable over the wires 44 to be connected. The passageways are not made of heat-recoverable material and do not bear markings. In use, the organizer 40 is placed over a plurality of wires 44 proximate to the first ends 46 of the wires. As shown in FIG. 5, no more than one wire is located in each passageway. The first ends 46 of the wires are electrically terminated in a selected sequence. Either before or preferably after such termination, the array 40 is slid along the wires towards the second ends 48 of the wires. This serves to organize the second ends of the wires in a sequence corresponding to the sequence in which the first ends of the the wires are electrically terminated. Then the second ends of the wires are electrically terminated in the corresponding sequence. Thus, the simple array 40 of passageways permits quick and easy organization and termination of the second ends of the wires, without requiring costly and time consuming hand sorting of a multitude of wire ends.

It is preferred that the first ends of the wires are fixed fast by electrical termination before the organizer is slid along the wires and the second ends are terminated. However, the sliding, or both the sliding and termination of the second ends, can be effected before the step of terminating the first ends of the wires.

As discussed above with reference to FIG. 1, the passageways of the array 40 shown in FIG. 5 can be made of heat-recoverable material so that the passageways can be heat-recovered on the wires. In like manner, markings can be placed on the exterior wall of the passageways so that the wires contained therein are identified. Moreover, as discussed above the organizer 40 can contain fusible solder or heat recoverable metal inserts so that the array can be used for forming electrical connections.

Figure 2:
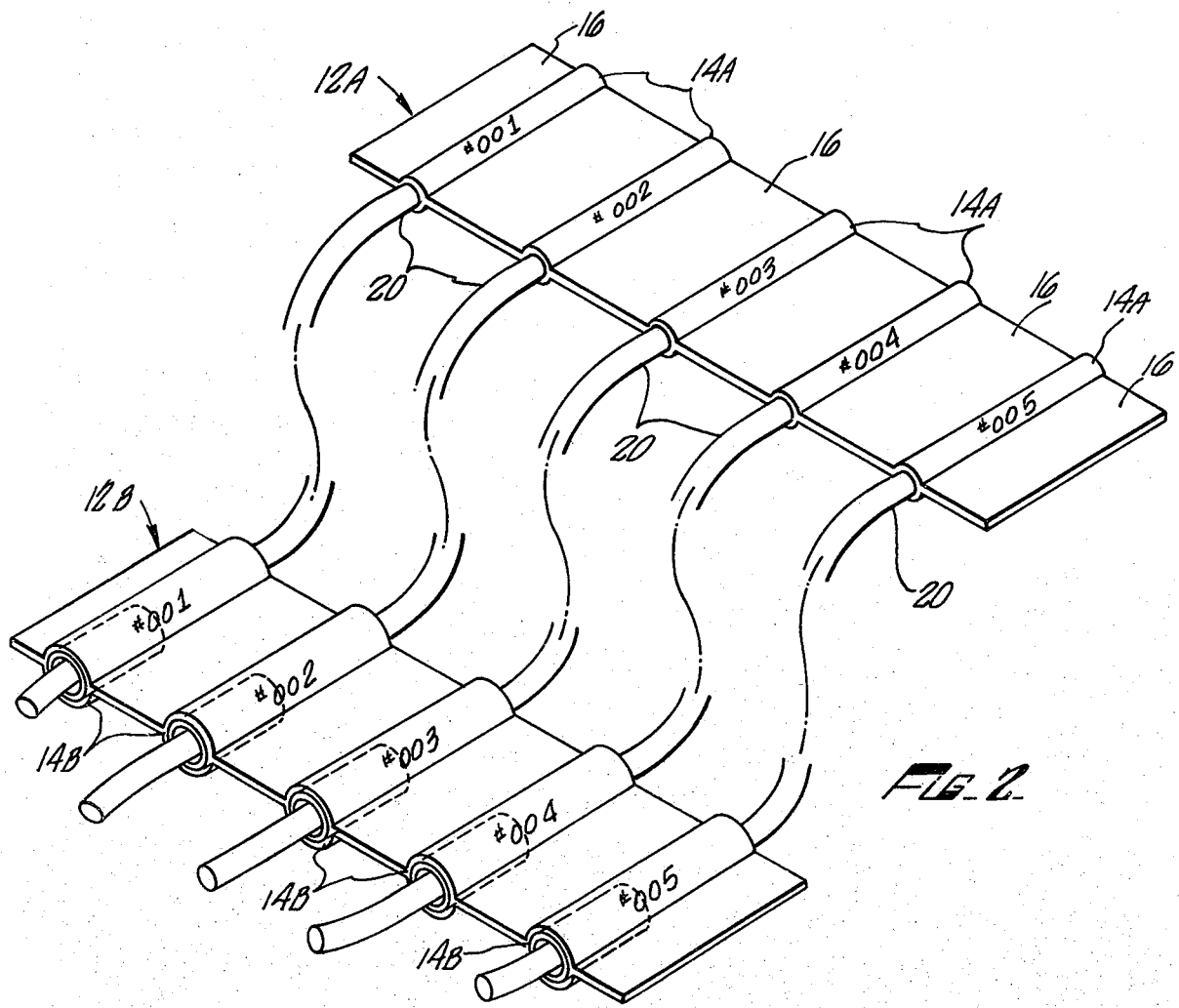
FIG. 2 shows the organizer of FIG. 1 after the two arrays of the apparatus are detached from each other.

It is possible to organize, identify, and terminate both ends of a plurality of wires with the organizer 10 of FIG. 1. This is effected by placing the organizer 10 over the wires proximate to the first ends thereof such that each wire is located in an aligned passageway of each array. Each passageway contains no more than one wire. The first array 12A is detached from the second array 12B. The first ends of the wires are electrically terminated to the terminals (not shown) by heating the passageways 14A of the first array 12A, thereby heat-shrinking them onto the first ends of the wires of the terminals. The heating causes the fusible solder inserts 25 to fuse, thereby forming the electrical connections. The detached second array 12B is slid along the wires towards the second ends of the wires into the position shown in FIG. 2. This serves to organize the second ends of the wires in a sequence corresponding to the selected sequence into which the first ends of the wires are electrically connected. The passageways of the second array are heat recovered over the wires and corresponding terminals (not shown). Heating also causes the fusible solder inserts 26 to fuse thereby forming the electrical connections at the second ends of the wires.

By this method, both ends of each wire are identified, and both ends of each wire are electrically connected in a desired configuration, without costly and time consuming searching through a multitude of wires, as required by prior art methods.

In the event that the organizer has three detachably connected arrays, the third array can be positioned around wires in a middle portion of the wires, each of the wires is identified at three locations along its length.

FIG. 4 shows a simplified version of the organizer of the present invention where the organizer 50 has passageways which are not enclosed tubular passageways. Instead, each passageway comprises two aligned holes 52 in a sheet of material. The organizer 50 in FIG. 4 comprises two arrays 54A and 54B of passageways. Therefore, each wire 56 passes through four aligned holes 52. A serrated separation line 58 is provided across the organizer 50 between the two arrays 54A and 54B for separation of the arrays. Organizer 50 depicts one of many possible versions of the invention which serves to organize and identify a plurality of wire ends thereby facilitating their electrical connection.

Although the present invention is described in considerable detail with reference to certain preferred versions thereof, other versions of the invention are possible. For example, it is not always necessary that the second array be slid along the wires. For example, in using the apparatus 50 shown in FIG. 4, it is possible that only the ends of the wires 56 are placed in the aligned holes, where the bulk of the length of the wires is left in the middle region 60 between the two arrays. After separation of the two arrays from each other, the arrays are already in position proximate to the ends of the wires, without requiring either array to be slid along the wires. Therefore, because of variations such as this, the spirit and scope of the appended claims should not be limited to the description of the preferred versions contained herein.

What is claimed is:

1. A method for marking each of a plurality of wires and for electrically connecting both the first and second ends of each wire comprising the steps of:

(a) placing on such wires proximate to a first end thereof by sliding over the first or second ends of the wires an organizer comprising at least two discrete arrays of tubular, substantially parallel, heat-recoverable enclosed passageways, each passageway being defined by a wall, wherein each array is slideable along the plurality of wires and passageways of one array are aligned with corresponding passageways of another array, each array being detachably connected to another array, at least a portion of the passageways of at least one array containing a fusible solder insert, wherein each such wire is located in an aligned passageway of each array, each passageway containing no more than one wire;
(b) detaching a first array from the organizer;
(c) heat-recovering said passageway walls of the first array on the wires over the first ends thereof and fusing any such solder inserts for electrically connecting the first ends of such wires in a selected sequence;
(d) sliding the apparatus with the first array detached along the wires toward the second ends of the wires thereby organizing the second ends of the wires in a sequence corresponding to the selected sequence into which the first ends of the wires are electrically connected; and
(e) heat-recovering said passageway walls of the second array on the second wires over the second ends thereof and fusing any such solder inserts for electrically connecting the second ends of the wires in the corresponding sequence.

2. A method for marking each of a plurality of wires and for organizing and electrically connecting both the first and second ends of each wire comprising the steps of:
(a) placing on such wires proximate to the first ends thereof by sliding over the first or second ends of the wires an apparatus comprising at least two discrete arrays of passageways, each passageway being defined by a wall, at least a portion of the walls comprising heat-recoverable material, each array comprising a plurality of, substantially parallel passageways and each array being slideable along a plurality of wires, wherein a passageway of one array is aligned with a corresponding passageway of another array and each array is detachably connected to at least one other array, aligned passageways having corresponding marks on their exterior surface, wherein each such wire is located in an aligned passageway of each array, each passageway containing no more than one wire;
(b) electrically connecting the first ends of such wires in a selected sequence;
(c) detaching a first array from the apparatus;
(d) positioning the first array on the wires proximate to the first ends thereof for identifying the wires;
(e) sliding the apparatus with the first array detached along the wires toward the second ends of the wires thereby organizing the second ends of the wires in a sequence corresponding to the selected sequence into which the first ends of the wires are electrically connected;
(f) electrically connecting the second ends of the wires in the corresponding sequence; and
(g) positioning passageways of a second array of the apparatus on the wires proximate to the second ends thereof for identifying the wires.

3. The method of claim 2 in which the wall of at least one passageway of the first array is heat-recovered over an electrically connected first end for insulating such a connected end.

4. The method of claim 2 in which at least one passageway of the first array has associated therewith a fusible solder insert and the steps of heat-recovering passageway walls of the first array and electrically connecting the first ends of such wires comprise fusing said insert.

5. The method of claim 2 in which at least one passageway of the second array has associated therewith a fusible solder insert and the steps of heat-recovering said passageway walls of the second array and electrically connecting the second ends of such wires comprise fusing said insert.

6. The method of claim 1 or 2 in which the apparatus comprises at least three arrays, and including the steps of separating the third array from the second array and heat-recovering passageway walls of the third array on the wires.

7. The method of claim 1 or 2 including the step of deforming the first array for changing the spatial arrangement between the passageways of the first array to allow electrical connection of the first ends of such wires in a selected spatial configuration.

8. The method of claim 1 or 2 including the step of deforming the second array for changing the spatial arrangement between the passageways of the second array to allow electrical connection of the second ends of such wires in a selected spatial configuration.

9. An apparatus for organizing and marking a plurality of elongated substrates, the apparatus comprising at least two discrete arrays of passageways, each passageway being defined by a wall, each array comprising a plurality of substantially parallel passageways and each array being slideable along a plurality of wires, wherein a passageway of one array is aligned with a corresponding passageway of another array and each array is detachably connected to at least one other array, the passageways being adapted for sliding onto the elongated substrates over the ends thereof, wherein said passageway walls comprise heat recoverable material.

10. An apparatus for organizing and marking a plurality of wires, the apparatus comprising at least two discrete arrays of tubular, substantially parallel, heat-recoverable, passageways enclosed by a wall, the passageways being adapted for sliding onto the wires over the ends thereof, wherein the apparatus is slideable along the plurality of wires for organizing the wires and passageways of one array are aligned with corresponding passageways of another array, the exterior surface of each passageway being marked with an indicia and aligned passageways having corresponding indicia, each array being detachably connected to at least one other array.

11. An apparatus for organizing and marking a plurality of elongated substrates, the apparatus comprising at least two discrete arrays of passageways, each passageway being defined by a wall which comprises a rigid material, each array comprising a plurality of substantially parallel passageways and each array being sideable along a plurality of wires, wherein a passageway of one array is aligned with a corresponding passageway of another array and each array is detachably connected to at least one other array, the passageways being adapted for sliding onto the elongated substrates over the ends thereof, wherein said passageway walls comprise heat-recoverable material.

12. The apparatus of claim 9, 10 or 11 wherein at least a portion of the passageways contain connection means.

13. The apparatus of claim 9, 10 or 11 wherein at least one passageway contains a fusible polymeric insert.

14. The apparatus of claim 12 in which the connection means comprises a fusible solder insert.

15. The apparatus of claim 12 in which the connection means comprises a heat-recoverable metallic insert.

* * * * *